United States Patent
Vaughn et al.

(10) Patent No.: US 11,704,493 B2
(45) Date of Patent: Jul. 18, 2023

(54) NEURAL PARSER FOR SNIPPETS OF DYNAMIC VIRTUAL ASSISTANT CONVERSATION

(71) Applicant: KYNDRYL, INC., New York, NY (US)

(72) Inventors: Garfield W. Vaughn, South Windsor, CT (US); Gandhi Sivakumar, Bentleigh (AU); Vasanthi M. Gopal, Plainsboro, NJ (US); Aaron K. Baughman, Cary, NC (US)

(73) Assignee: KYNDRYL, INC., New York, NY (US)

( * ) Notice: Subject to any disclaimer, the term of this patent is extended or adjusted under 35 U.S.C. 154(b) by 619 days.

(21) Appl. No.: 16/743,384

(22) Filed: Jan. 15, 2020

(65) Prior Publication Data

US 2021/0216706 A1 Jul. 15, 2021

(51) Int. Cl.
  *G06F 40/30* (2020.01)
  *G06F 40/205* (2020.01)
  *G06N 3/02* (2006.01)
  *G06F 18/24* (2023.01)

(52) U.S. Cl.
  CPC .............. *G06F 40/30* (2020.01); *G06F 18/24* (2023.01); *G06F 40/205* (2020.01); *G06N 3/02* (2013.01)

(58) Field of Classification Search
  CPC ..... G06F 40/205; G06F 40/30; G06K 9/6267; G06N 3/02; G06N 3/08
  See application file for complete search history.

(56) References Cited

U.S. PATENT DOCUMENTS

| | | |
|---|---|---|
| 4,994,966 A | 2/1991 | Hutchins |
| 7,657,423 B1 | 2/2010 | Harik et al. |
| 9,536,049 B2 | 1/2017 | Brown et al. |
| 10,068,174 B2 | 9/2018 | Aili et al. |
| 2009/0006543 A1 | 1/2009 | Smit |

(Continued)

OTHER PUBLICATIONS

Claessen et al. "Virtual Assistants: A Study on the Usability and User Perception of Customer Service Systems for E-Commerce", Proceedings of the 15th International Symposium of Information Science (ISI 2017), Berlin, Mar. 13-15, 2017.

(Continued)

*Primary Examiner* — Jianxun Yang
(74) *Attorney, Agent, or Firm* — Tutunjian & Bitetto, P.C.; Erik Swanson

(57) ABSTRACT

Pairing a user response and associated context with a neural network associated with a virtual assistant computer during a dynamic text conversation with an end user. The virtual assistant computer receives a detected user generated text input; determines context of the detected user generated text input; compares the context of the detected user generated text input by comparing a confidence score representing context of the user generated input to a classification associated with each of a plurality of existing nodes of a neural network. For confidence scores below a threshold relative to the classification associated with each of the existing nodes of the neural network, the virtual assistant computer creates a new node within the neural network and assigns the context of the user generated text to the new node.

20 Claims, 7 Drawing Sheets

(56) References Cited

U.S. PATENT DOCUMENTS

| | | | |
|---|---|---|---|
| 2010/0185437 A1* | 7/2010 | Visel | G06F 40/30 |
| | | | 704/9 |
| 2017/0187654 A1 | 6/2017 | Lee | |
| 2018/0174020 A1* | 6/2018 | Wu | G06F 16/338 |
| 2018/0268821 A1 | 9/2018 | Levanon | |
| 2018/0309707 A1 | 10/2018 | Bastide | |
| 2020/0311473 A1* | 10/2020 | Agarwal | G06K 9/6256 |

OTHER PUBLICATIONS

"Method and System for Voluntarily Inserting an Unsolicited Response in Human Conversations", An IP.com Prior Art Database Technical Disclosure; IP.com No. IPCOM000256314D; Nov. 17, 2018.

"Polite mode for a virtual assistant", An IP.com Prior Art Database Technical Disclosure; IP.com No. IPCOM000253213D; Mar. 14, 2018.

Page et al. "Conversational Application Services Ecosystem", An IP.com Prior Art Database Technical Disclosure; IP.com No. IPCOM000249823D; Apr. 11, 2017.

IBM. "Personalized chatbot service", An IP.com Prior Art Database Technical Disclosure; IP.com No. IPCOM000181584D; Apr. 6, 2009.

"Making Intelligent Virtual Assistants a Reality"; retrieved from https://www.earley.com/knowledge/white-paper/making-intelligent-virtual-assistants-reality; 2018.

* cited by examiner

NEURAL PARSER FOR SNIPPETS OF DYNAMIC VIRTUAL ASSISTANT CONVERSATION

BACKGROUND

The present invention relates to neural parsers, and more specifically to a neural parser for snippets or sentence components of dynamic virtual assistant conversations.

Artificial intelligent (AI) systems are evolving and being used to solve a variety of problems in various industries. One such emerging industry is artificial intelligence based virtual assistants. AI virtual assistants are expected to provide human-like interaction with a human user. Common issues occur during the interaction of a human users and an AI virtual assistant when communicating in a normal chat based communication. Each human user has their own style and pattern of written communication. For example, each user uses a different style of interacting, with some users using incomplete sentences, which could be due to typing pattern or using incomplete causal fragments within the same sentence driven by a typing pattern and some users using a co-reference pattern with a dependent inter sentence to the previous sentence at varying levels of hierarchy, all of which is difficult for the AI virtual assistant to decipher and provide an appropriate response for.

While AI virtual assistants are designed to identify ambiguity based on classifications, AI virtual assistants lack in lower level analysis thus requiring a specialized engine to analyze the patterns inline and dynamically respond.

SUMMARY

According to one embodiment of the present invention, a method of pairing a user response and associated context with a neural network associated with a virtual assistant computer during a dynamic text conversation with an end user is disclosed. The method comprising the steps of: the virtual assistant computer receiving detected user generated text input; the virtual assistant computer determining context of the detected user generated text input; the virtual assistant computer comparing the context of the detected user generated text input by comparing a confidence score representing context of the user generated input to a classification associated with each of a plurality of existing nodes comprising a neural network; for confidence scores below a threshold relative to the classification associated with each of the plurality of existing nodes of the neural network, the virtual assistant computer creating a new node within the neural network and assigning the context of the detected user generated text to the new node; and for confidence scores equal to or above a threshold relative to the classification associated with each of the plurality of existing nodes of the neural network, the virtual assistant computer assigning the context of the detected user generated text to an existing node of the plurality of nodes of the neural network with a same or similar context.

According to another embodiment of the present invention, a computer program product for pairing a user response and associated context with a neural network associated with a virtual assistant computer during a dynamic text conversation with an end user is disclosed. The virtual assistant computer comprises at least one processor, one or more memories, one or more computer readable storage media, the computer program product comprising a computer readable storage medium having program instructions embodied therewith. The program instructions are executable by the computer to perform a method comprising: receiving, by the virtual assistant computer, detected user generated text input; determining, by the virtual assistant computer, context of the detected user generated text input; comparing, by the virtual assistant computer, the context of the detected user generated text input by comparing a confidence score representing context of the user generated input to a classification associated with each of a plurality of existing nodes comprising a neural network; for confidence scores below a threshold relative to the classification associated with each of the plurality of existing nodes of the neural network, creating, by the virtual assistant computer, a new node within the neural network and assigning the context of the detected user generated text to the new node; and for confidence scores equal to or above a threshold relative to the classification associated with each of the plurality of existing nodes of the neural network, assigning, by the virtual assistant computer, the context of the detected user generated text to an existing node of the plurality of nodes of the neural network with a same or similar context.

According to another embodiment of the present invention, a computer system for pairing a user response and associated context with a neural network associated with a virtual assistant computer during a dynamic text conversation with an end user. The virtual assistant computer comprising at least one processor, one or more memories, one or more computer readable storage media having program instructions executable by the computer to perform the program instructions comprising: receiving, by the virtual assistant computer, detected user generated text input; determining, by the virtual assistant computer, context of the detected user generated text input; comparing, by the virtual assistant computer, the context of the detected user generated text input by comparing a confidence score representing context of the user generated input to a classification associated with each of a plurality of existing nodes comprising a neural network; for confidence scores below a threshold relative to the classification associated with each of the plurality of existing nodes of the neural network, creating, by the virtual assistant computer, a new node within the neural network and assigning the context of the detected user generated text to the new node; and for confidence scores equal to or above a threshold relative to the classification associated with each of the plurality of existing nodes of the neural network, assigning, by the virtual assistant computer, the context of the detected user generated text to an existing node of the plurality of nodes of the neural network with a same or similar context.

DETAILED DESCRIPTION

Figure 1:
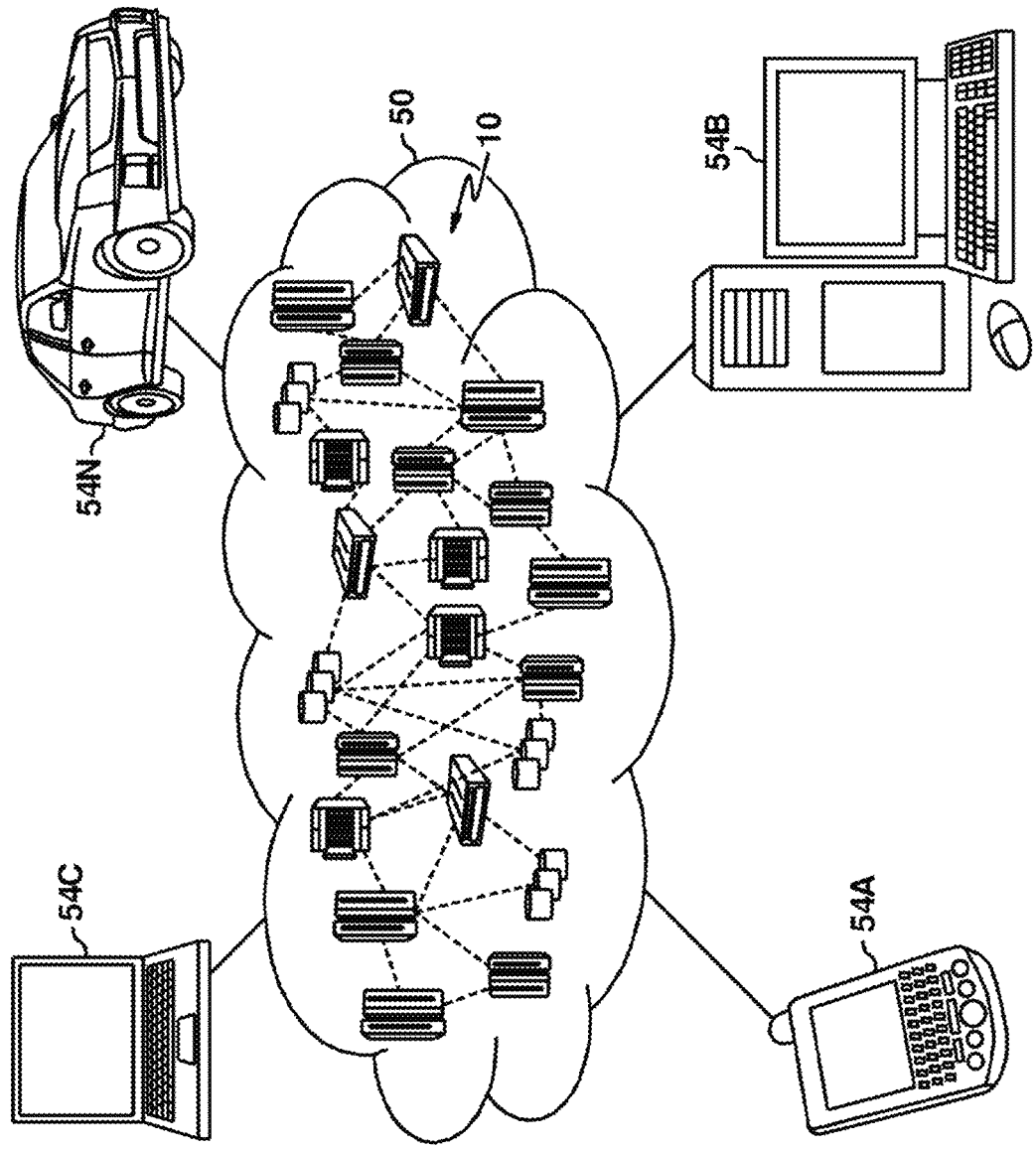
FIG. 1 depicts a cloud computing node according to an embodiment of the present invention.

A virtual assistant or chatbot is an application designed to simulate conversation with human users over the Internet, with the human users speaking or inputting dialog in their natural language via a graphical user interface (GUI). The virtual assistant via a virtual assistant engine integrates within a session manager of a conversation between an end user and the virtual assistant and processes the user input inline and infers user typing pattern using a user pattern utterance ground truth.

A neural network is a computer system made up of a plurality of highly interconnected processing elements which process information by their dynamic state response to external inputs. The neural network is organized into layers, with each of the layers comprising a plurality of interconnected nodes which contain an activation function. The layers preferably include an input layer, one or more hidden layers and an output layer. The input layer receives input for processing, such as raw text created by the user and communicates with the one or more hidden layers. The one or more hidden layers process the input based on weighted connections and calculates scores for sentence components. The hidden layers are linked to the output layer where an output is generated and/or presented. The weights of the connections are modified based on the input received via the input layer.

In an embodiment of the present invention, a collection of conversation pattern data of both functional and nonfunctional components is stored in a database as ground truth. The ground truth refers to information provided by direct observation and is considered to be accurate data that can be used as reference and can be used to compare against the results from training in order to determine success or failure.

In an embodiment of the present invention, a user response is paired with an associated context with a neural network associated with a virtual assistant computer during a dynamic text conversation with an end user. The virtual assistant computer receives a detected user generated text input; determines context of the detected user generated text input; compares the context of the detected user generated text input by comparing a confidence score representing context of the user generated input to a classification associated with each of a plurality of existing nodes of a neural network. For confidence scores below a threshold relative to the classification associated with each of the existing nodes of the neural network, the virtual assistant computer creates a new node within the neural network and assigns the context of the user generated text to the new node.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, remote devices, or a combination of cloud consumers and remote devices. The remote devices can be, for example, personal digital assistant (PDA) or cellular telephone 54A, desktop computer 54B, laptop computer 54C, and/or automobile computer system 54N may communicate. Cloud computing nodes 10 may communicate with one another and may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices or remote devices 54A-54N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
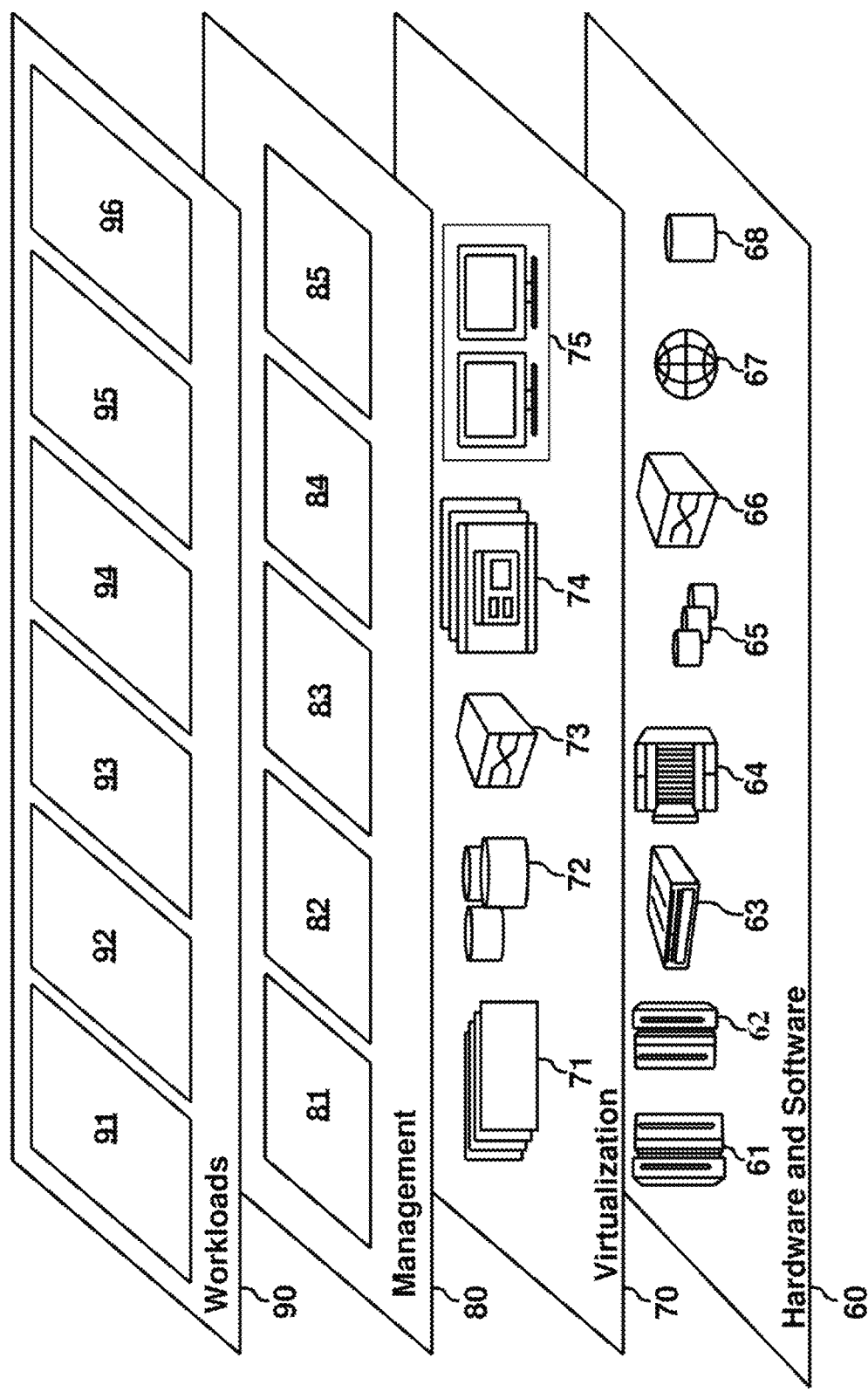
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment 50, and billing or invoicing for consumption of these resources. In one example, these resources may include application software licenses. Security provides identity verification for cloud consumers and tasks, as well as protection for data and other resources. User portal 83 provides access to the cloud computing environment 50 for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual assistant dynamic conversation processing 96.

Figure 3:
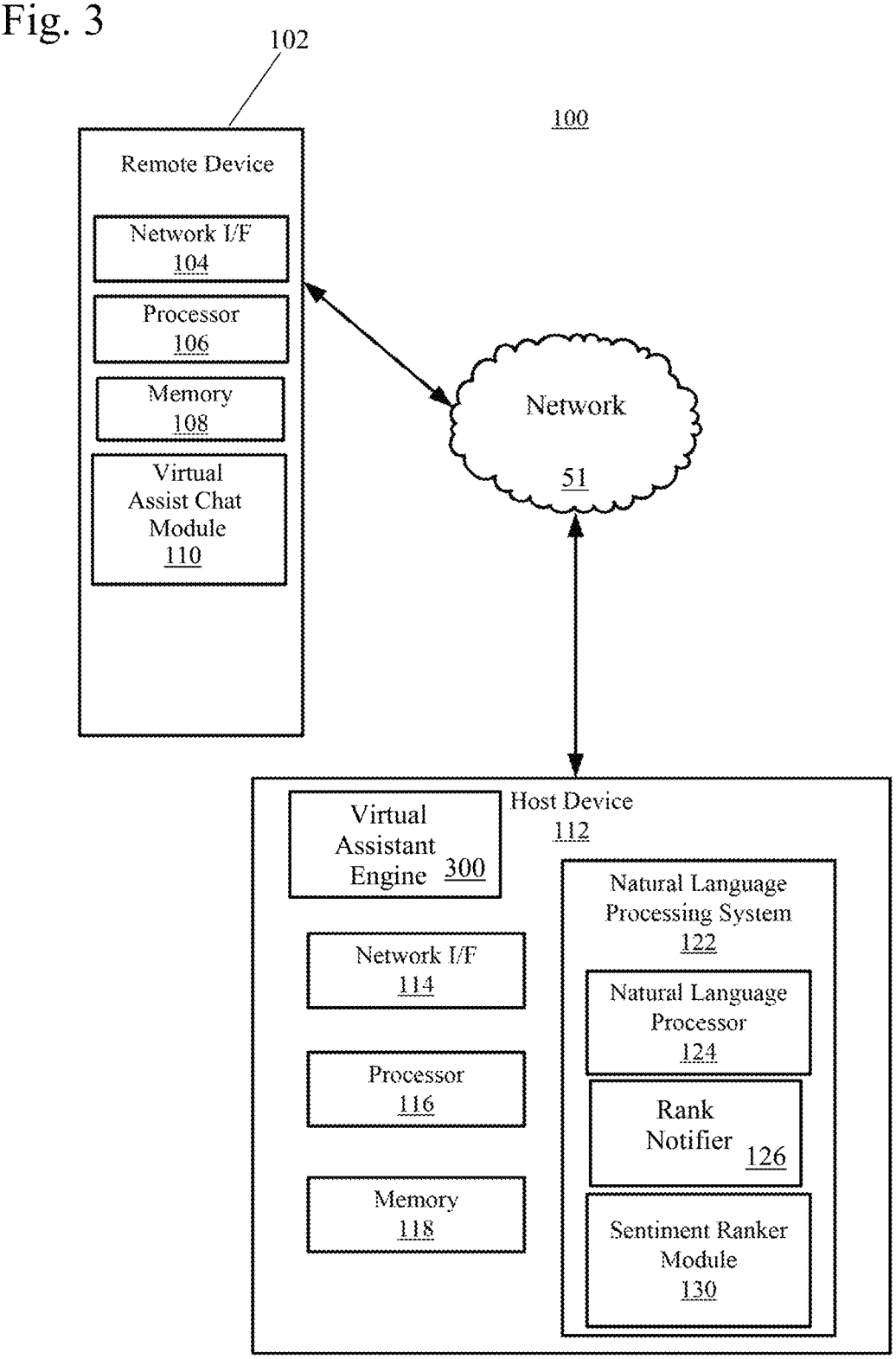
FIG. 3 shows illustrates a block diagram of an example computing environment in which illustrative embodiments of the present disclosure may be implemented.
Figure 4:
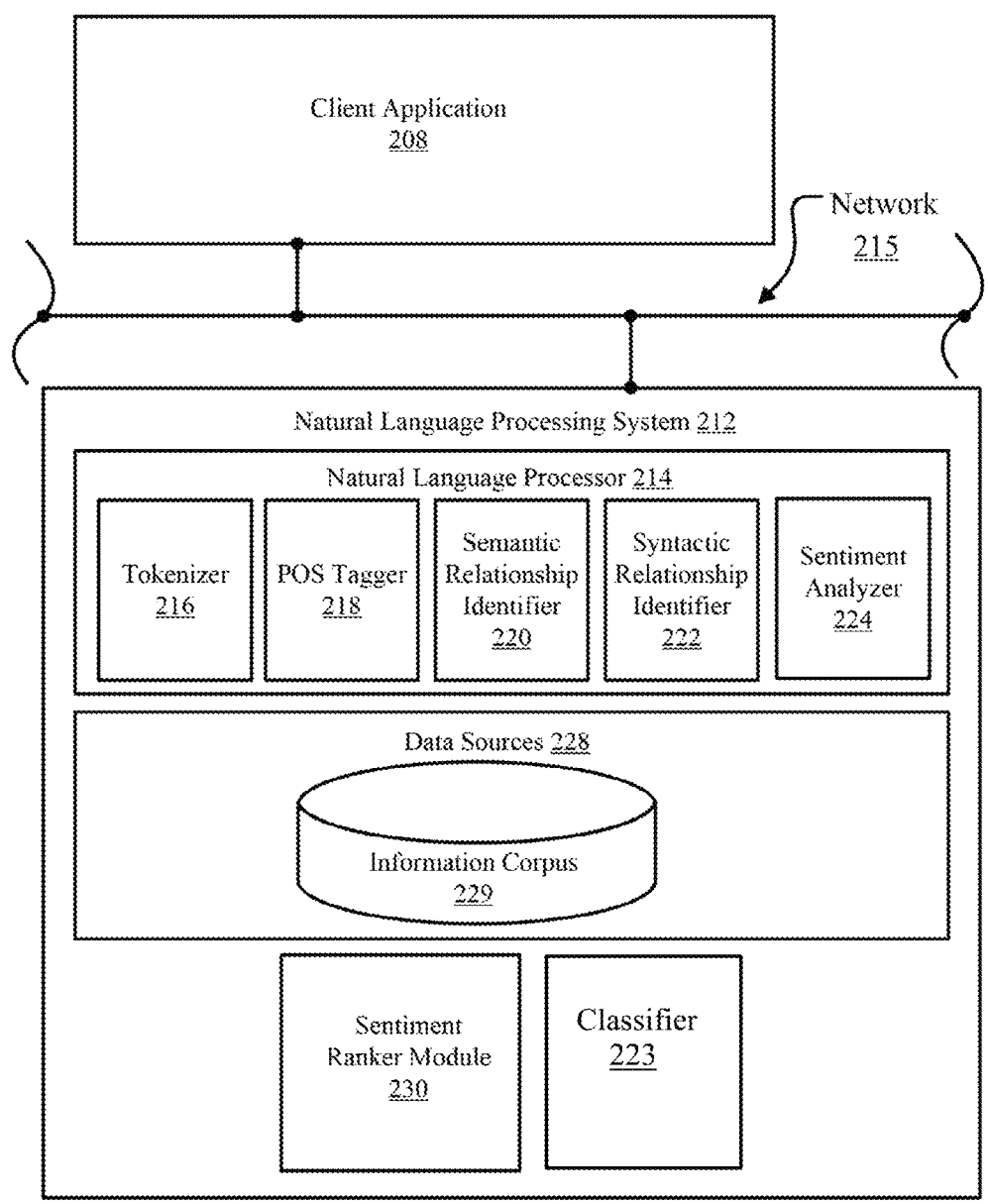
FIG. 4 illustrates a block diagram of an exemplary system architecture, including a natural language processing system, configured to use product reviews to rank product features, in accordance with embodiments of the present disclosure.
Figure 5:
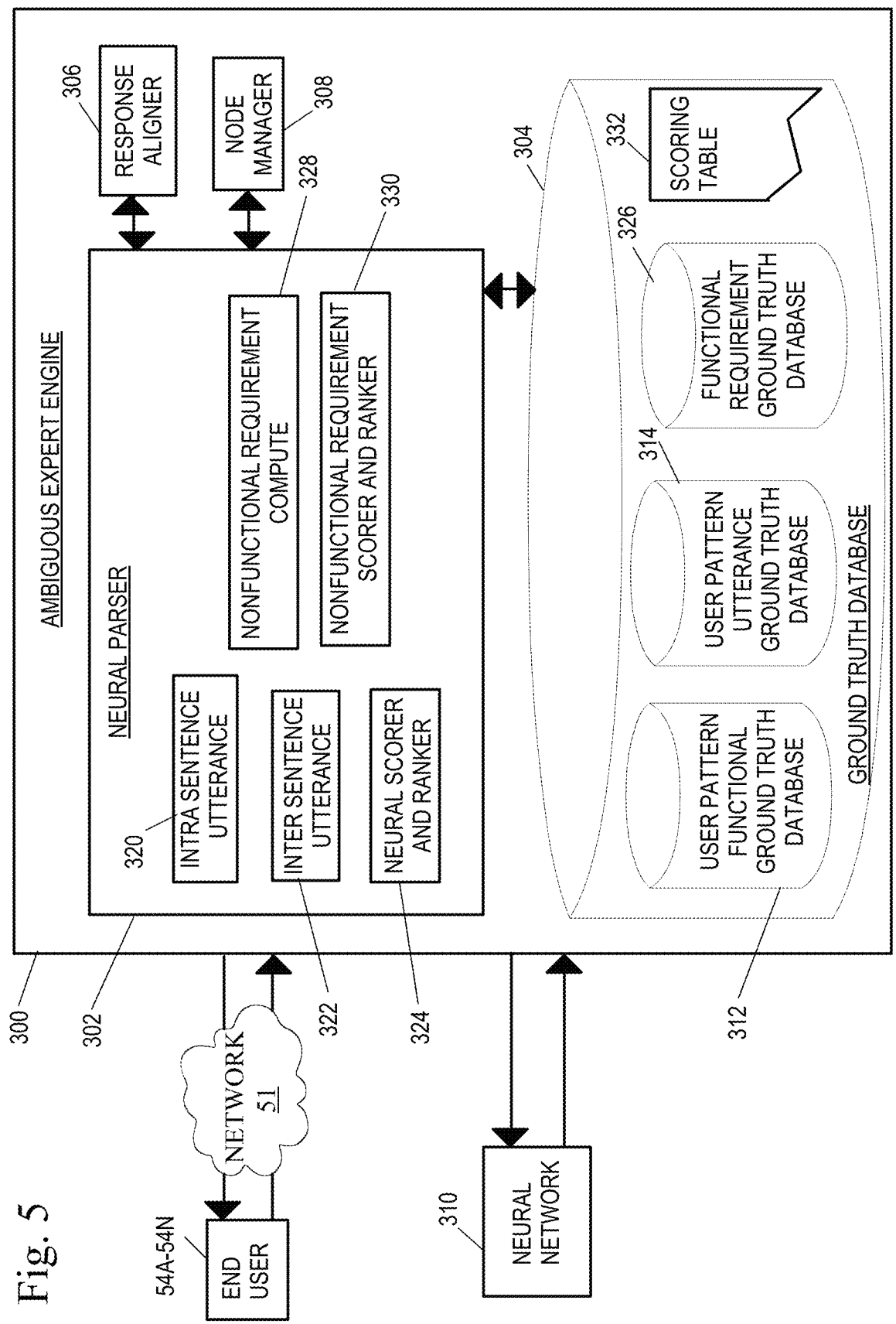
FIG. 5 shows a schematic of a virtual assistant engine of an embodiment of the present invention.

FIG. 5 shows architecture of a virtual assistant engine. The virtual assistant engine 300 is in communication with an end user via graphical user interface (GUI) through a cloud computing environment 50 or a network 51 via a device of a cloud consumer or remote device 54A-54N and a neural network 310. The cloud consumer can be a remote device as shown in FIGS. 3-4. The virtual assistant engine 300 includes a neural parser 302, a ground truth database 304, a response aligner 306, and a node manager 308. While specific components are shown as comprising the virtual assistant engine 300, additional components may be added or other components removed. The virtual assistant engine 300 is in communication with one or more neural networks 310 which can be within a single node or a plurality of cloud computing nodes 10 of the network 51. The response aligner 306 includes response models based on a confidence score which is combination of function and nonfunctional scores determined from user generated input of the chat conversation of the virtual assistant with the user. The node manager 308 manages and assigns user generated input to a node of the neural network 310 depending on the context of a node within the neural network 310 and preferably includes a virtual assistant chat module 110 described in further detail below. The node manager 308 can additionally create nodes if an existing node with an applicable context is not present within the neural network 310. The node manager 308 can determine and track neural components within multiple interconnected nodes within the neural network.

The neural parser 302 includes an intra sentence utterance 320, an inter sentence utterance 322, a neural scorer and ranker 324, a functional requirement ground truth database 326, a nonfunctional requirement compute 328 and a nonfunctional requirement scorer and ranker 330. The neural parser 302 is in communication within the virtual assistant engine 300 with a ground truth database 304, a response aligner 306 and a node manager 308. The ground truth database 304 includes a user pattern functional ground truth database 312, a user pattern utterance ground truth database 314, and a functional requirement ground truth database 326. The user pattern functional ground truth database 312 includes a collection of neural sentence components of various sentences from historical conversations between a user and a virtual assistant and nodal profiles with training of neural components of previous nodes for inter sentence processing. The user pattern utterance ground truth database 314 includes a collection of micro level components of behavior of users, keyboard interactions and other nonfunctional components, for example how fast users type, how often users use the 'enter' command, milliseconds between words under specific bandwidth conditions, etc. The functional requirement ground truth database 326 is the basis in which functional aspects of the user generated input are compared to. Functional components present in the functional requirement ground truth database 326 can include patterns of user interaction. For example, line 1 of text entered by a user has a subject and the user will provide an enter command, corresponding to a user pattern in which the user uses incomplete sentences and that additional information will be provided by the user in a next utterance by the user.

The inter sentence utterance 322 identifies neural sentence components from user generated input. For example neural sentence components can include, but are not limited to the neural subject, the neural object, neural verb, neural adjective, and neural predicate.

The intra sentence utterance 320 and the inter sentence utterance 322 identifies context of the user generated input through natural language processing (NLP), which is sent to the node manager 308 as a control in which other user generated input is compared to. FIG. 3 illustrates a block diagram of an example computing environment 100 in which illustrative embodiments of the present disclosure may be implemented. In some embodiments, the computing environment 100 may include a remote device 54A-54N and a host device 112. The host device 112 may be incorporated into or may include the virtual assistant engine 300.

Consistent with various embodiments, the remote device MA-MN and the host device 112 may be computer systems. The remote device MA-MN and the host device 112 may include one or more processors 106 and 116 and one or more memories 108 and 118, respectively. The remote device MA-MN and the host device 112 may be configured to communicate with each other through an internal or external network interface 104 and 114. The network interfaces 104 and 114 may be, for example, modems or network interface cards. The remote device 54A-54N and/or the host device 112 may be equipped with a display or monitor. Additionally, the remote device 54A-54N and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 54A-54N and/or the host device 112 may be servers, desktops, laptops, automobile computer, or handheld devices.

In some embodiments, the network 51 can be implemented within a cloud computing environment 50, or using one or more cloud computing services as described relative to FIGS. 1-2 above. Consistent with various embodiments, a cloud computing environment 50 may include a network-based, distributed data processing system that provides one or more cloud computing services. Further, a cloud computing environment 50 may include many computers (e.g., hundreds or thousands of computers or more) disposed within one or more data centers and configured to share resources over the network 51.

While not shown, in some embodiments, the network 51 can be implemented using any number of any suitable communications media. For example, the network 51 may be a wide area network (WAN), a local area network (LAN), an internet, or an intranet. In certain embodiments, the remote device 54A-54N and the host device 112 may be local to each other and communicate via any appropriate local communication medium. For example, the remote device 54A-54N and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 54A-54N may be hardwired to the host device 112 (e.g., connected with an Ethernet cable) while a second remote device (not shown) may communicate with the host device using the network 51 (e.g., over the Internet).

In some embodiments, the remote device 54A-54N may enable users to provide user generated input for interaction with a virtual assistant to the host devices 112 in order to determine the context of the user generated input (e.g., by natural language processing system 122) and aid in determining whether the virtual assistant should respond and/or how the virtual assistant should respond back to the user. For example, the remote device 54A-54N may include a virtual assistant chat module 110 and a user interface (UI). The virtual assistant chat module 110 may be in the form of a web browser or any other suitable software module, and the UI may be any type of interface (e.g., command line prompts, menu screens, graphical user interfaces). The UI may allow a user to interact with the remote device 54A-54N to submit, using the a virtual assistant chat module 110, user generated input to the host device 112.

In some embodiments, the host device 112 may include a natural language processing system 122. The natural language processing system 122 may include a natural language processor 124, a rank notifier 126, and a sentiment ranker module 130. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 4.

In some embodiments, the sentiment ranker module 130 may be configured to user generated input based on an analysis of the sentiment associated with ingested user generated input.

In some embodiments, the natural language processing system 122 may further include a search application (not shown). The search application may be implemented using a conventional or other search engine, and may be distributed across multiple computer systems. The search application may be configured to search one or more databases or other computer systems. For example, the search application may be configured to search a corpus of information related to previous responses to user generated input previously submitted by virtual assistant chat module 110 in order to identify what responses were previously supplied in response to the user generated input.

While FIG. 3 illustrates a computing environment 100 with a single host device 112 and a single remote device MA-MN, suitable computing environments for implementing embodiments of this disclosure may include any number of remote devices and host devices. The various modules, systems, and components illustrated in FIG. 3 may exist, if at all, across a plurality of host devices and remote devices.

It is noted that FIG. 3 is intended to depict the representative major components of an exemplary computing environment 100. In some embodiments, however, individual components may have greater or lesser complexity than as represented in FIG. 3, components other than or in addition to those shown in FIG. 3 may be present, and the number, type, and configuration of such components may vary.

Referring now to FIG. 4, shown is a block diagram of an exemplary system architecture 200, including a natural language processing system 212, configured to determine context of the user generated input, in accordance with embodiments of the present disclosure. In some embodiments, a remote device (such as remote device 102 of FIG. 3) may submit user generated input via a graphical user interface (GUI) to the natural language processing system 212 which may be housed on a host device (such as host device 112 of FIG. 3). Such a remote device may include a client application 208 with a chat function in communication with a virtual assistant engine 300, which may itself involve one or more entities operable to generate or modify information in the webpages that are then dispatched to a natural language processing system 212 via a network 215.

Consistent with various embodiments, the natural language processing system 212 may respond to electronic document submissions sent by the client application 208. Specifically, the natural language processing system 212 may analyze user generated input to aid in the analysis of the user input for response from a virtual assistant. In some embodiments, the natural language processing system 212 may include a natural language processor 214, data sources 228, and a sentiment ranker module 230.

The natural language processor 214 may be a computer module that analyzes the user generated input. The natural language processor 214 may perform various methods and techniques for analyzing user generated input such as text (e.g., syntactic analysis, semantic analysis, etc.). The natural language processor 214 may be configured to recognize and analyze any number of natural languages. In some embodiments, the natural language processor 214 may parse passages of user generated input. Further, the natural language processor 214 may include various modules to perform analyses of user generated input. These modules may include, but are not limited to, a tokenizer 216, a part-of-speech (POS) tagger 218, a semantic relationship identifier 220, a syntactic relationship identifier 222, sentiment analyzer 224, and a classifier 223.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document or virtual conversation and break any text passages within the virtual conversation into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic conversations between a same user and a virtual assistant or another user and a virtual assistant (e.g., the content of one electronic conversation between a user and a virtual assistant may shed light on the meaning of text elements in another electronic conversation, particularly if conversation are regarding a same problem or feature). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

Consistent with various embodiments, the sentiment analyzer 224 may be a computer module that is configured to identify and categorize the sentiments associated with tokens of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used by the sentiment analyzer 224 as are known to those skilled in the art (e.g., Naïve Bayes lexical model).

Consistent with various embodiments, a classifier 223 can classify identified context into predetermined categories which can also be associated with nodes of the neural network.

In some embodiments, the natural language processor 214 may be a computer module that may parse an entire electronic conversation or a portion of an electronic conversation through a graphical user interface (GUI) and generate corresponding data structures for one or more portions of the electronic conversation. In some embodiments, a parsed text element may be represented in the form of a parse tree or other graph structure. To generate the parsed text element, the natural language processor 214 may trigger computer modules 216-224.

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the previous electronic conversations. Data stored in the information corpus 229 may be structured in a way to specifically address analytic requirements.

In some embodiments, the natural language processing system 212 may include a sentiment ranker module 230. The sentiment ranker module 230 may be a computer module that is configured to generate sentiment scores for components of the user generated input. The sentiment ranker module 230 may be further configured to rank the portions of the user generated input based on these sentiment scores.

The nonfunctional requirement compute 328 determines nonfunctional aspects of the user generated input. Nonfunctional aspects include, but are not limited to how fast user input is typed or generated, how often an enter command is given, how many words are typed between enter commands, number of misspelled words, and how often the user discussed multiple topics.

The nonfunctional requirement scorer and ranker 330 receives data from the nonfunctional requirement compute 328 and scores and ranks the nonfunctional components based on a comparison to data in the ground truth database 304.

The neural scorer and ranker 324 scores individual neural sentence components and ranks them based on both functional and nonfunctional components. Scores for one sentence component are ranked against other sentence components that are related to the same node. Ranking of the individual neural sentence components aids in selecting the correct node among similar nodes and provide the right response (including no response) to the user generated input.

Figure 6:
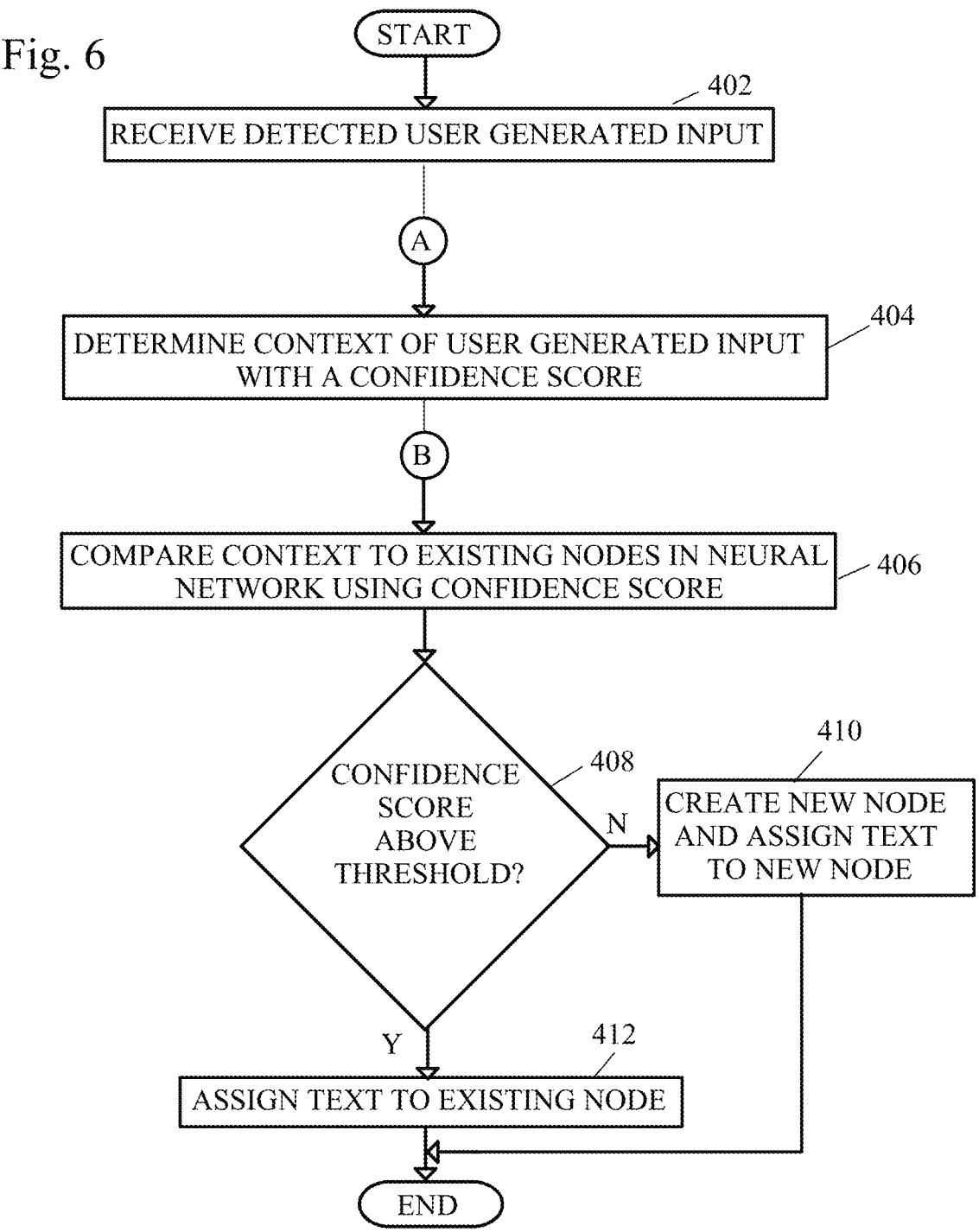
FIG. 6 shows a method of pairing a user response and associated context with a neural network associated with a virtual assistant during a dynamic conversation with an end user.
Figure 7:
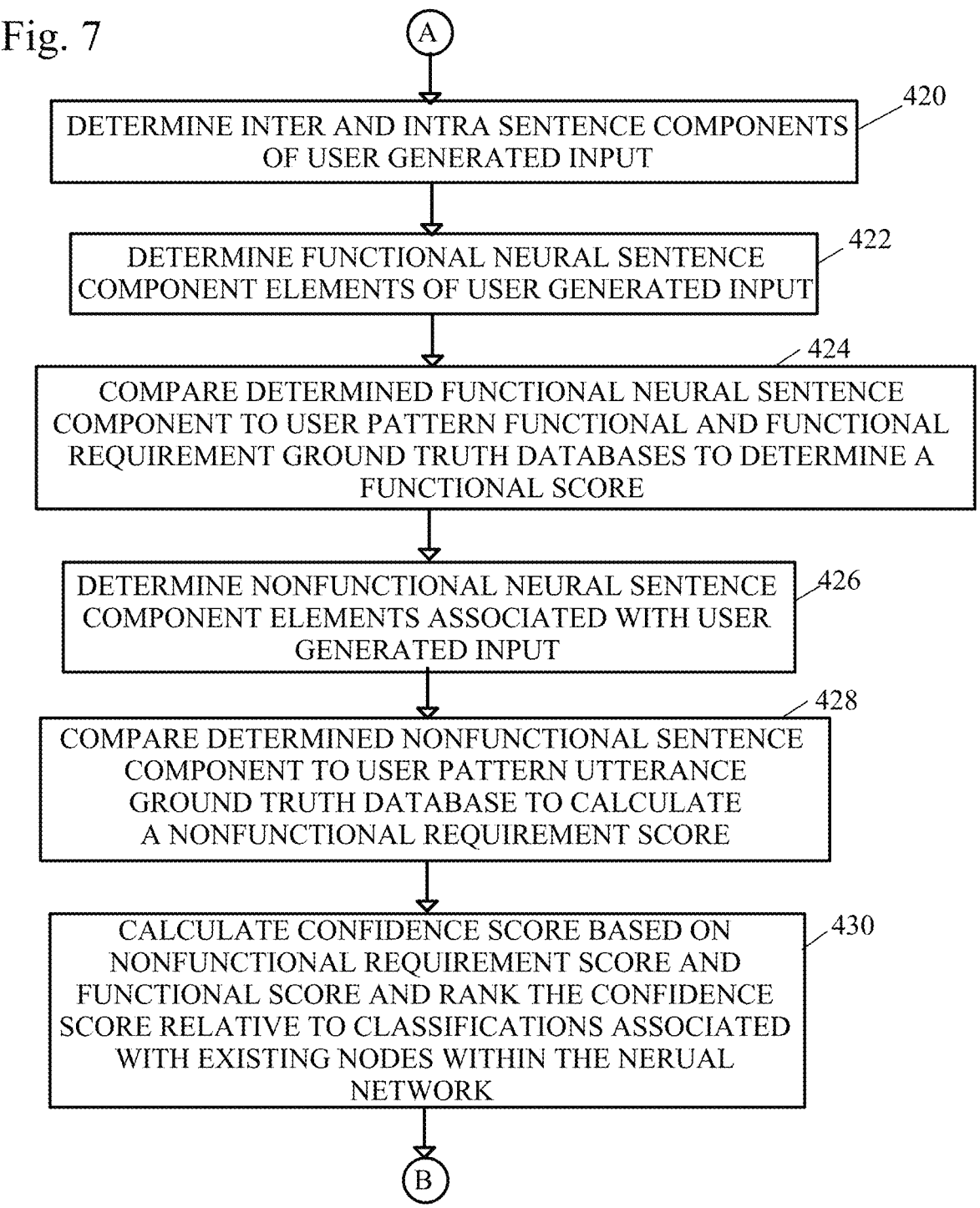
FIG. 7 shows a method of determining context of user generated input.

FIGS. 6-7 show a method of pairing a user response and associated context with a neural network associated with a virtual assistant during a dynamic conversation with an end user.

In a first step, the virtual assistant engine 300 receives a detected user generated input (step 402). The detected user generated input is preferably text which can be entered into a user device, such as remote device 54A-54N. Each detected user generated input is preferably separated from the next detected user generated input by an enter command.

The virtual assistant engine 300 determines context of the user generated input with a confidence score (step 404). The substeps for determining the context of the user generated input is shown in FIG. 7 in steps 420-430. The virtual assistant engine 300 consolidates inter and intra sentence utterances provided as user generated input to determine the intent of a question being asked and to ensure that the intra sentence utterance is assigned to the correct node. The consolidation occurs after the neural components of the sentence have been determined.

The virtual assistant engine 300 via the node manager 308 compares the context of the user generated input to existing nodes in the neural network using a confidence score calculated in substeps 420-430 (step 406). Since each of the existing nodes in the neural network corresponds to intent based on context and includes an associated classification with confidence levels, when an input question is raised, based on the context of the input question from the user, the user generated input is passed thru the classifier 223 to determine predetermined categories associated with the nodes in order to identify the closest or most similar node with a high confidence represented by a confidence score.

If the context of the user generated input is the same or similar to an existing node in a neural network based on a confidence score and is greater than or equal to an associated threshold, (step 408), the user generated input is assigned to an existing node of the neural network (step 412) and the method ends.

If the context of the user generated input is not the same or similar to the context based on the confidence score being below a threshold relative to any existing node in the neural network (step 408), the node manager 308 creates a new node and assigns the text of the user generated input to the new node (step 410) and the method ends. The node manager 308 logs or maintains an table with the context associated with each node of the neural network 310. After the method of the present invention ends, the virtual assistant engine 300 uses the neural network via the response aligner 306 to determine whether a response is dynamically provided in response to the user generated input or whether to purposely wait for additional user generated input.

FIG. 7 shows the method of determining context of user generated input of step 404.

In a first step in determining context of user generated input, the virtual assistant engine 300 via the inter sentence utterance 322 and the intra sentence utterance 320, determines intra and inter sentence components from the detected user generated input (step 420).

The virtual assistant engine 300 determines functional neural sentence component elements of the user generated input (step 422). The functional neural sentence component element can be determined through natural language processing as described above relative to FIGS. 3-4. The neural sentence component element can include, but is not limited to a neural sentence object, a neural sentence adjective, and a neural sentence verb.

The determined neural sentence component elements are compared to the user pattern functional ground truth database 312 and the functional requirement ground truth database 326 to determine a functional score (step 424). The functional score is based on functional neural sentence components and user profile as captured in the user pattern functional ground truth database 312. Every entry in the ground truth database 304 has an entry in a scoring table 332, pairing entries in the ground truth database 304 with an associated score. The scores for each identified neural sentence component may be combined to form a single functional score. The scores for specific ground truth database entries can be altered by an administrator or may alter over time based on historical patterns that may emerge. The scoring table 332 may be present in the ground truth database 304.

The nonfunctional requirement compute 328 in association with the intra sentence utterance 320 of the virtual assistant engine 300 determines nonfunctional neural sentence component elements associated with the user generated input (step 426). The nonfunctional neural sentence components allow for the identification of keyboard errors and determining mistakes in the user generated input such as repeating of keyboard characters.

The nonfunctional requirement scorer and ranker 330 of the virtual assistant engine 300 calculates a nonfunctional requirement score of the nonfunctional neural sentence component elements by comparing the nonfunctional neural sentence components to the user pattern utterance ground truth database 314 (step 428). The nonfunctional score is based on nonfunctional neural sentence components and the user profile as captured in the user pattern utterance ground truth database 314. Every entry in the ground truth database 304 has an entry in a scoring table 332, pairing entries in the ground truth database 304 with an associated score. The scores for each identified neural sentence component element may be combined to form a single nonfunctional requirement score. The scores for specific ground truth database entries can be altered by an administrator or may alter over time based on historical patterns that may emerge. The scoring table 332 may be present in the ground truth database 304.

The neural scorer and ranker 324 of the virtual assistant engine 300 calculates a confidence score based on the nonfunctional requirement score and the functional score and ranks the confidence score relative to classifications associated with existing nodes within the neural network (step 430) and then then the method returns to step 406 of comparing the context to existing nodes in the neural network using the confidence score.

The example below shows user generated text that is provided to virtual assistant. VA below corresponds to the virtual assistant engine 300.

Example

User: Hello
VA: Hello
User: I was . . . <<enter>>
VA: (WAIT)<<virtual assistance engine waits and does not respond since no neural sentence object was detected from the user generated input>>
User: rushing towards <<enter>>
VA: (WAIT)<<virtual assistance engine waits and does not respond since no neural sentence object was detected from the user generated input>>
User: Towards my car and saw my neighbor's cat struck inside.
VA: <<virtual assistance engine identifies inter sentence co-reference and picks the object from the previous chat line and determines "rushing" is a verb neural sentence component and that "saw" is another verb neural sentence component; the virtual assistance engine identifies the typing speed as being 70 words per minute and calculates a nonfunctional score and a functional score which is combined into a confidence score of 78; the confidence score would classify the user generated input and would be compared to a threshold to determine which, if any nodes, the user generated input should be assigned to in the neural network>>

By using the method of the above embodiments, the virtual assistance engine 300 can combine two or three distinct user generated inputs of phrases or sentences (separated by an enter command), such that the virtual assistant engine 300, after the user generated input is assigned to an appropriate node of the neural network anywhere within the neural network, as opposed to the virtual assistant searching sequentially through nodes to locate an appropriate node in the neural network for the user generated input, allowing the virtual assistance engine to respond based on the node chosen in the neural network. If multiple relevant nodes are identified, the highest scoring node is selected to respond.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of pairing a user response and associated context with a neural network associated with a virtual assistant computer during a dynamic text conversation with an end user, the method comprising:
   the virtual assistant computer receiving detected user generated text input;
   the virtual assistant computer determining context of the detected user generated text input by:
      employing a nonfunctional requirement compute component and a nonfunctional requirement scorer and ranker component; and
      determining nonfunctional neural sentence component elements from the nonfunctional requirement compute component to compare the nonfunctional neural sentence component elements to a user pattern utterance ground truth database including a collection of micro level components of user behaviors and keyboard interactions to generate a nonfunctional score;
   the virtual assistant computer comparing the context of the detected user generated text input by comparing a confidence score representing context of the user generated input to a classification associated with each of a plurality of existing nodes comprising a neural network;
   for confidence scores below a threshold relative to the classification associated with each of the plurality of existing nodes of the neural network, the virtual assistant computer creating a new node within the neural network and assigning the context of the detected user generated text to the new node; and
   for confidence scores equal to or above a threshold relative to the classification associated with each of the plurality of existing nodes of the neural network, the virtual assistant computer assigning the context of the detected user generated text to an existing node of the plurality of nodes of the neural network with a same or similar context.

2. The method of claim 1, wherein the virtual assistant computer determining the context of the detected user generated text input further comprises the virtual assistant computer:
   determining inter sentence components and intra sentence components of the detected user generated text input;
   determining functional neural sentence component elements of the detected user generated text input based on the inter sentence components;
   comparing the functional neural sentence component elements to the user pattern functional ground truth database including: neural sentence components of a plurality of sentences from historical conversations between a user and the virtual assistant computer and nodal profiles with training of neural components of previous nodes of the neural network for inter sentence processing, and a functional requirement ground truth database including functional aspects of user generated input, to determine a functional score;
   calculating a confidence score based on the combination of the nonfunctional score and the functional score; and
   ranking the confidence score relative to classifications associated with the plurality of existing nodes within the neural network.

3. The method of claim 2, wherein the nonfunctional score represents all of the identified nonfunctional neural sentence component elements within the detected user generated text input.

4. The method of claim 2, wherein the functional score represents all of the identified functional neural sentence component elements within the detected user generated text input.

5. The method of claim 2, wherein the functional neural sentence component elements are determined through natural language processing.

6. The method of claim 2, wherein functional neural sentence components are a neural sentence object, a neural sentence adjective, neural predicate, and a neural sentence verb.

7. The method of claim 2, wherein the behavior of the users and the keyboard interactions includes: how fast the users type, how often the users use the enter command, and how often the user misspells words.

8. A computer program product for pairing a user response and associated context with a neural network associated with a virtual assistant computer during a dynamic text conversation with an end user, the virtual assistant computer comprising at least one processor, one or more memories, one or more computer readable storage media, the computer program product comprising a computer readable storage medium having program instructions embodied therewith, the program instructions executable by the computer to perform a method comprising:
  receiving, by the virtual assistant computer, detected user generated text input;
  determining, by the virtual assistant computer, context of the detected user generated text input by:
    employing a nonfunctional requirement compute component and a nonfunctional requirement scorer and ranker component; and
    determining nonfunctional neural sentence component elements from the nonfunctional requirement compute component to compare the nonfunctional neural sentence component elements to a user pattern utterance ground truth database including a collection of micro level components of user behaviors and keyboard interactions to generate a nonfunctional score;
  comparing, by the virtual assistant computer, the context of the detected user generated text input by comparing a confidence score representing context of the user generated input to a classification associated with each of a plurality of existing nodes comprising a neural network;
  for confidence scores below a threshold relative to the classification associated with each of the plurality of existing nodes of the neural network, creating, by the virtual assistant computer, a new node within the neural network and assigning the context of the detected user generated text to the new node; and
  for confidence scores equal to or above a threshold relative to the classification associated with each of the plurality of existing nodes of the neural network, assigning, by the virtual assistant computer, the context of the detected user generated text to an existing node of the plurality of nodes of the neural network with a same or similar context.

9. The computer program product of claim 8, wherein the program instructions of the virtual assistant computer determining the context of the detected user generated text input further comprises the program instructions of the virtual assistant computer:
  determining inter sentence components and intra sentence components of the detected user generated text input;
  determining functional neural sentence component elements of the detected user generated text input based on the inter sentence components;
  comparing the functional neural sentence component elements to the user pattern functional ground truth database including: neural sentence components of a plurality of sentences from historical conversations between a user and the virtual assistant computer and nodal profiles with training of neural components of previous nodes of the neural network for inter sentence processing, and a functional requirement ground truth database including functional aspects of user generated input, to determine a functional score;
  calculating a confidence score based on the combination of the nonfunctional score and the functional score; and
  ranking the confidence score relative to classifications associated with the plurality of existing nodes within the neural network.

10. The computer program product of claim 9, wherein the nonfunctional score represents all of the identified nonfunctional neural sentence component elements within the detected user generated text input.

11. The computer program product of claim 9, wherein the functional score represents all of the identified functional neural sentence component elements within the detected user generated text input.

12. The computer program product of claim 9, wherein the functional neural sentence component elements are determined through natural language processing.

13. The computer program product of claim 9, wherein functional neural sentence components are a neural sentence object, a neural sentence adjective, neural predicate, and a neural sentence verb.

14. The computer program product of claim 9, wherein the behavior of the users and the keyboard interactions includes: how fast the users type, how often the users use the enter command, and how often the user misspells words.

15. A computer system for pairing a user response and associated context with a neural network associated with a virtual assistant computer during a dynamic text conversation with an end user, the virtual assistant computer comprising at least one processor, one or more memories, one or more computer readable storage media having program instructions executable by the computer to perform the program instructions comprising:
  receiving, by the virtual assistant computer, detected user generated text input;
  determining, by the virtual assistant computer, context of the detected user generated text input by:
    employing a nonfunctional requirement compute component and a nonfunctional requirement scorer and ranker component; and
    determining nonfunctional neural sentence component elements from the nonfunctional requirement compute component to compare the nonfunctional neural sentence component elements to a user pattern utterance ground truth database including a collection of micro level components of user behaviors and keyboard interactions to generate a nonfunctional score;
  comparing, by the virtual assistant computer, the context of the detected user generated text input by comparing a confidence score representing context of the user generated input to a classification associated with each of a plurality of existing nodes comprising a neural network;
  for confidence scores below a threshold relative to the classification associated with each of the plurality of existing nodes of the neural network, creating, by the virtual assistant computer, a new node within the neural network and assigning the context of the detected user generated text to the new node; and
  for confidence scores equal to or above a threshold relative to the classification associated with each of the plurality of existing nodes of the neural network, assigning, by the virtual assistant computer, the context of the detected user generated text to an existing node of the plurality of nodes of the neural network with a same or similar context.

16. The computer system of claim 15, wherein the program instructions of the virtual assistant computer determining the context of the detected user generated text input further comprises the program instructions of the virtual assistant computer:

determining inter sentence components and intra sentence components of the detected user generated text input;

determining functional neural sentence component elements of the detected user generated text input based on the inter sentence components;

comparing the functional neural sentence component elements to the user pattern functional ground truth database including: neural sentence components of a plurality of sentences from historical conversations between a user and the virtual assistant computer and nodal profiles with training of neural components of previous nodes of the neural network for inter sentence processing, and a functional requirement ground truth database including functional aspects of user generated input, to determine a functional score;

calculating a confidence score based on the combination of the nonfunctional score and the functional score; and ranking the confidence score relative to classifications associated with the plurality of existing nodes within the neural network.

17. The computer system of claim 16, wherein the nonfunctional score represents all of the identified nonfunctional neural sentence component elements within the detected user generated text input.

18. The computer system of claim 16, wherein the functional score represents all of the identified functional neural sentence component elements within the detected user generated text input.

19. The computer system of claim 16, wherein the functional neural sentence component elements are determined through natural language processing.

20. The computer system of claim 16, wherein the behavior of the users and the keyboard interactions includes: how fast the users type, how often the users use the enter command, and how often the user misspells words.

\* \* \* \* \*